US009085930B2

(12) United States Patent  
Steiner et al.

(10) Patent No.: US 9,085,930 B2  
(45) Date of Patent: Jul. 21, 2015

(54) DEVICE FOR CARRIER PROTECTION

(71) Applicant: STEINER INNOVATIONS, Newport Beach, CA (US)

(72) Inventors: Richard Francis Steiner, Arroyo Grande, CA (US); Donald William Steiner, Newport Beach, CA (US); Scott Jewett, Mission Viejo, CA (US)

(73) Assignee: STEINER INNOVATIONS, Newport Beach, CA (US)

( * ) Notice: Subject to any disclaimer, the term of this patent is extended or adjusted under 35 U.S.C. 154(b) by 0 days.

(21) Appl. No.: 14/152,614

(22) Filed: Jan. 10, 2014

(65) Prior Publication Data

US 2014/0307310 A1  Oct. 16, 2014

Related U.S. Application Data

(60) Provisional application No. 61/751,168, filed on Jan. 10, 2013.

(51) Int. Cl.

| G02B 5/20 | (2006.01) |
| E06B 9/24 | (2006.01) |
| B62B 9/14 | (2006.01) |

(52) U.S. Cl.  
CPC ... *E06B 9/24* (2013.01); *B62B 9/14* (2013.01); *G02B 5/208* (2013.01)

(58) Field of Classification Search  
None  
See application file for complete search history.

(56) References Cited

U.S. PATENT DOCUMENTS

| 2,556,950 | A | * | 6/1951 | Walker | 296/97.9 |
| 3,304,118 | A | * | 2/1967 | Jonas | 296/97.6 |
| 3,954,297 | A | * | 5/1976 | Linke et al. | 296/97.6 |
| 4,261,649 | A | * | 4/1981 | Richard | 359/614 |
| 5,975,558 | A | * | 11/1999 | Sittu | 280/647 |
| 5,975,613 | A | * | 11/1999 | Sippel | 296/77.1 |
| 6,000,415 | A | * | 12/1999 | Huo et al. | 137/1 |
| 6,217,099 | B1 | * | 4/2001 | McKinney et al. | 296/77.1 |
| 6,381,750 | B1 | * | 5/2002 | Mangan | 2/10 |
| 2004/0244301 | A1 | * | 12/2004 | Dickson et al. | 52/3 |
| 2005/0168006 | A1 | | 8/2005 | Darland | |
| 2006/0186690 | A1 | * | 8/2006 | Taqvi et al. | 296/97.1 |
| 2008/0203757 | A1 | * | 8/2008 | Gilberg | 296/100.16 |
| 2009/0096257 | A1 | * | 4/2009 | Gordon et al. | 297/184.12 |
| 2010/0031409 | A1 | * | 2/2010 | Norris | 2/2.5 |
| 2011/0048482 | A1 | * | 3/2011 | Yerian | 135/125 |

* cited by examiner

*Primary Examiner* — Arnel C Lavarias  
(74) *Attorney, Agent, or Firm* — Arent Fox LLP; J.D. Harriman

(57) ABSTRACT

The system provides a removable sun screen that can provide shade and/or UV protection for strollers, car seats, and other carriers for infants and toddlers. The device has adjustable fastening means that allow it to be used with a plurality of carriers. The device includes at least four deformable and semi-rigid fastening mechanisms that are pivotally mounted to a screen member. The pivotal mounting allows the fastening mechanisms to be repositioned as desired, allowing the device to have more universal application to a multiple of carriers. The device includes two top straps that are also bendable and can be pivoted to aid in affixing the screen member to a carrier.

13 Claims, 1 Drawing Sheet

DEVICE FOR CARRIER PROTECTION

This patent application claims priority to U.S. Provisional Patent Application No. 61/751,168 filed on Jan. 10, 2013 which is incorporated by reference herein in its entirety.

BACKGROUND

There are a number of situations where people need protection from the sun, particularly the UV radiation portion of sunlight that can cause sunburn and long term damage to the skin. Infants in particular are sensitive to sunlight yet there are many instances when infants will be potentially exposed to sunlight, such as in a stroller or in a car seat. In addition, the infant might be exposed to flying objects that could injure or discomfort the infant.

It is desirable to provide a protective screen for the infant in these and other situations.

SUMMARY

The system provides a removable sun screen that can provide impact protection, shade, and/or UV protection for strollers, car seats, and other carriers for infants and toddlers. The device has adjustable fastening means that allow it to be used with a plurality of carriers. The device comprises at least four deformable and semi-rigid fastening mechanisms that are pivotally mounted to a screen member. The pivotal mounting allows the fastening mechanisms to be repositioned as desired, allowing the device to have more universal application to a multiple of carriers. The device includes two top straps that are also bendable and can be pivoted to aid in affixing the screen member to a carrier.

DETAILED DESCRIPTION OF THE SYSTEM

The device is a screen/shade to provide protection of an infant in a carrier such as a stroller, car seat, and the like. The device comprises a screen that provides shade and/or UV protection. In one embodiment, the screen is transparent or semi-transparent so that a caretaker can still observe the infant in the carrier. In other instances, the screen may be opaque to provide the maximum shading effect and protection.

Figure 1:
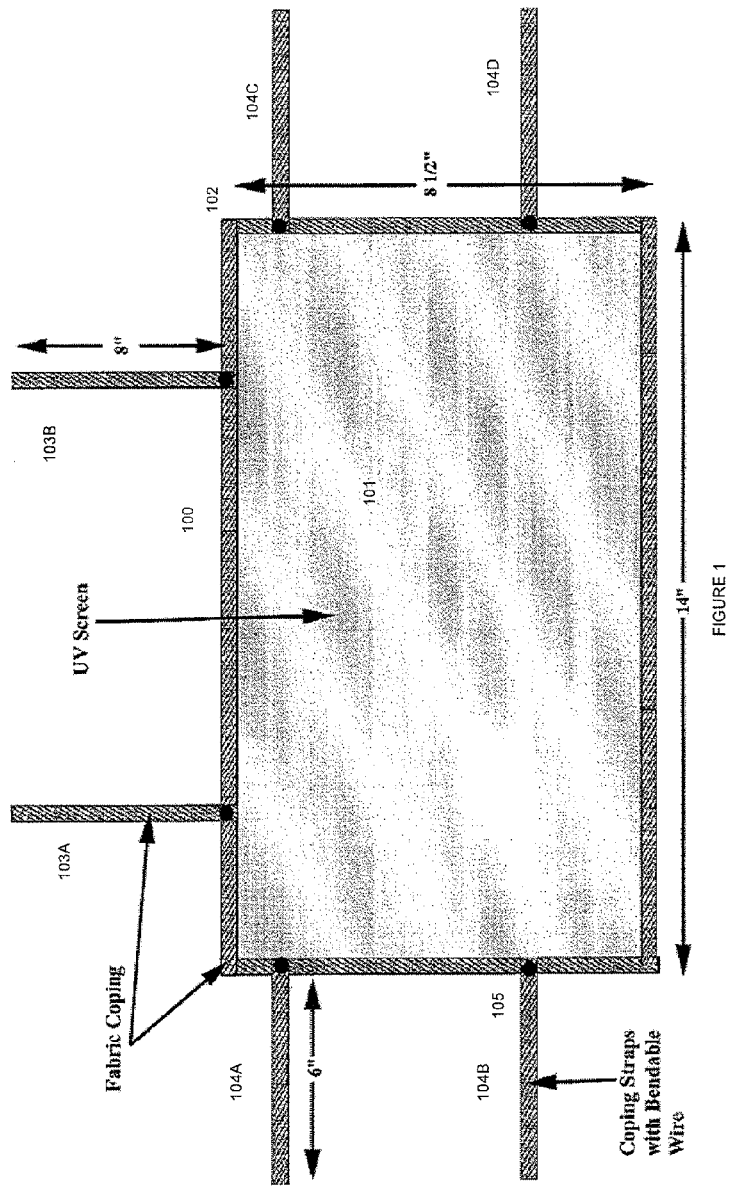
FIG. 1 is a perspective view of an embodiment of the device.

FIG. 1 is an example of one embodiment of the device. The device 100 comprises a central screen portion 101 surrounded by border region 102. A pair of top straps 103A and 103B are pivotally attached to the border 102. Side straps 104A, 104B (left side) and 104C and 104D (right side) are also pivotally attached to the border 102. Although not shown, in one embodiment the device may include bottom straps as well. It should be noted that the screen 101 may be implemented as a one piece design without a separate border if desired.

The central screen portion 101 is a UV protection screen that may be comprised of plastic. The screen 101 may be continuous or may have some ventilation openings formed thereon. The screen 101 may also comprise a flexible netting or mesh type of material that provides shade while still "breathing" and allowing the passage of air. The system anticipates a screen 101 material that provides UV protection while allowing the infant to be able to see through the screen as desired.

The screen may also comprise an impact resistant material to provide protection for the infant. Suitable materials for this embodiment include polycarbonate sheet stock or other shatter-proof or shatter-resistant materials.

In one embodiment, the screen is approximately 14 inches in length by 8.5 inches in height. However, the screen 101 may be of other dimensions without departing from the scope and spirit of the system. Although illustrated as a rectangle, the screen 101 may be of any suitable shape to provide protection of a carrier opening, including circular, oval, or any other suitable shape.

The top straps 103A and 103B, as well as the side straps 104A-140D, may be comprised of fabric, plastic, or some other suitable material, with a bendable insert disposed therein. The bendable insert allows deformation of the straps that allow the screen to be attached to a carrier. The straps are bent or deformed to lightly grip the carrier (typically on the outside of the carrier) so that the device 100 may be secured in place. The deformable inserts are such that they can be deformed at many points along their length, so that different gripping positions of the straps may be implemented, depending on the size of the carrier. The device 100 can be oriented horizontally or vertically depending on the opening to be protected.

An advantage of the deformable straps is that the device 100 will stay in place during normal use, due to the low energy forces typically involved in strolling or walking with an infant in a carrier. However, if a parent or guardian needs immediate access to the infant, the device 100 can be quickly and easily removed by the application of sufficient pulling force to overcome the gripping force of the deformable straps. This is an advantage over prior art devices that are fixedly attached to a carrier using VELCRO fastening strips, buckles, loops, and ties. Those devices take significantly more time to remove, presenting a danger during an urgent situation.

In one embodiment, the straps 103 and 104 of the device are coupled to the border by a button, pin, rivet, or other fastening means that allows pivotal movement of the strap, at least in the 180 degrees about the outside of the border 102, or full 360 degree movement about the pivotal mounting device. This allows the straps to be positioned at a variety of angles that permit more ease of attaching the device 100 to a variety of carriers. The buttons 105 provide enough friction to hold the strap in a particular orientation. When some of the straps are not in use, they can be oriented to overlap the border 102 so that they are out of the way.

In one embodiment, the straps may be placed at the corners of the screen 101, in lieu of, or in addition to, one or more of the straps illustrated in FIG. 1.

Figure 2:
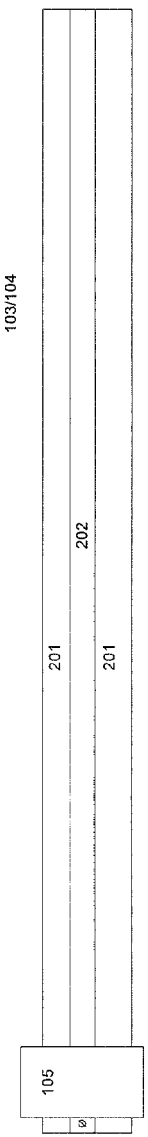
FIG. 2 is a cutaway view of a strap in an embodiment of the system.

FIG. 2 is a cutaway view of a strap 103 or 104 of FIG. 1. The strap 103/104 is comprised of a cover 201 with an insert 202. The cover 201 may be fabric, plastic, mesh, elastic, rubber, or any suitable material that may be non-destructively deformed. Within the cover 201 is an insert 202 that is deformable in a manner such that it holds its shape after deformation. This material may be a bendable metal strip or wire, or some other material that may be deformed or bent in such a manner that it retains its new shape after deformation.

In another embodiment, the strap may be comprised of a spring metal that is preformed into some desirable shape (e.g. a coil, loop, or inward curve) and can be snapped into place when placed on the carrier. An example of such an embodiment is similar to "slap bracelets" that can be held flat but revert to a preformed shape with the application of some force.

In one embodiment, the strap 103/104 is secured to the border 102 via a fastener 105 that allows for pivotal movement of the strap about the fastener. In the embodiment of FIG. 2, the fastener is a circular rivet, shaft, button, or the like that is inserted through an opening in the strap and fastened to the border. In some cases, the fastening device may be a button, and the strap may have a buttonhole formed therein. When buttoned to the button on the border, the strap is free to move pivotally about the thread holding the button in place. In another embodiment, the strap may include a snap member (e.g. female portion) that is secured to the other snap member (e.g. male portion) while still allowing pivotal movement of the strap about the fastening location. In other instances a rivet may be used to provide some holding friction to help keep the straps in the location at which they have been pivoted for use.

In one embodiment, the border itself may include a deformable insert in one or more edges to aid in shaping the device so that optimum coverage of the infant in the carrier may be obtained.

In one embodiment, the screen 101 is printable. This allows a logo or other indicia to be formed on the screen. This allows the device to be offered by a merchant or advertiser as a premium or give-away, with the logo or indicia serving as advertising for the merchant.

What is claimed is:

1. A device comprising:
a screen having a border about its edge;
a plurality of straps coupled to the screen at the border wherein each strap is deformable about an opening in an infant carrier in a manner such that the strap retains its shape after deformation.

2. The device of claim 1 wherein the screen comprises a transparent screen providing ultra-violet (UV) UV protection from sunlight.

3. The device of claim 2 wherein each strap is pivotally mounted to the border and is capable of rotating about an attachment point.

4. The device of claim 3 wherein the attachment point comprises a button.

5. The device of claim 3 wherein the attachment point comprises a snap fastener.

6. The device of claim 3 wherein the attachment point comprises a rivet.

7. The device of claim 3 wherein the strap comprises a deformable cover portion having a bendable insert member.

8. A device comprising:
a screen having a border about its edge;
a plurality of straps coupled to the screen at the border wherein each strap is deformable in a manner such that the strap retains its shape after deformation,
wherein the screen comprises a transparent screen providing ultra-violet (UV) protection from sunlight.

9. The device of claim 8 wherein each strap is pivotally mounted to the border and is capable of rotating about an attachment point.

10. The device of claim 9 wherein the attachment point comprises a button.

11. The device of claim 9 wherein the attachment point comprises a snap fastener.

12. The device of claim 9 wherein the attachment point comprises a rivet.

13. The device of claim 9 wherein the strap comprises a deformable cover portion having a bendable insert member.

* * * * *